May 7, 1946. J. F. CROWTHER 2,399,723
GAS HYDRATION
Filed June 28, 1941
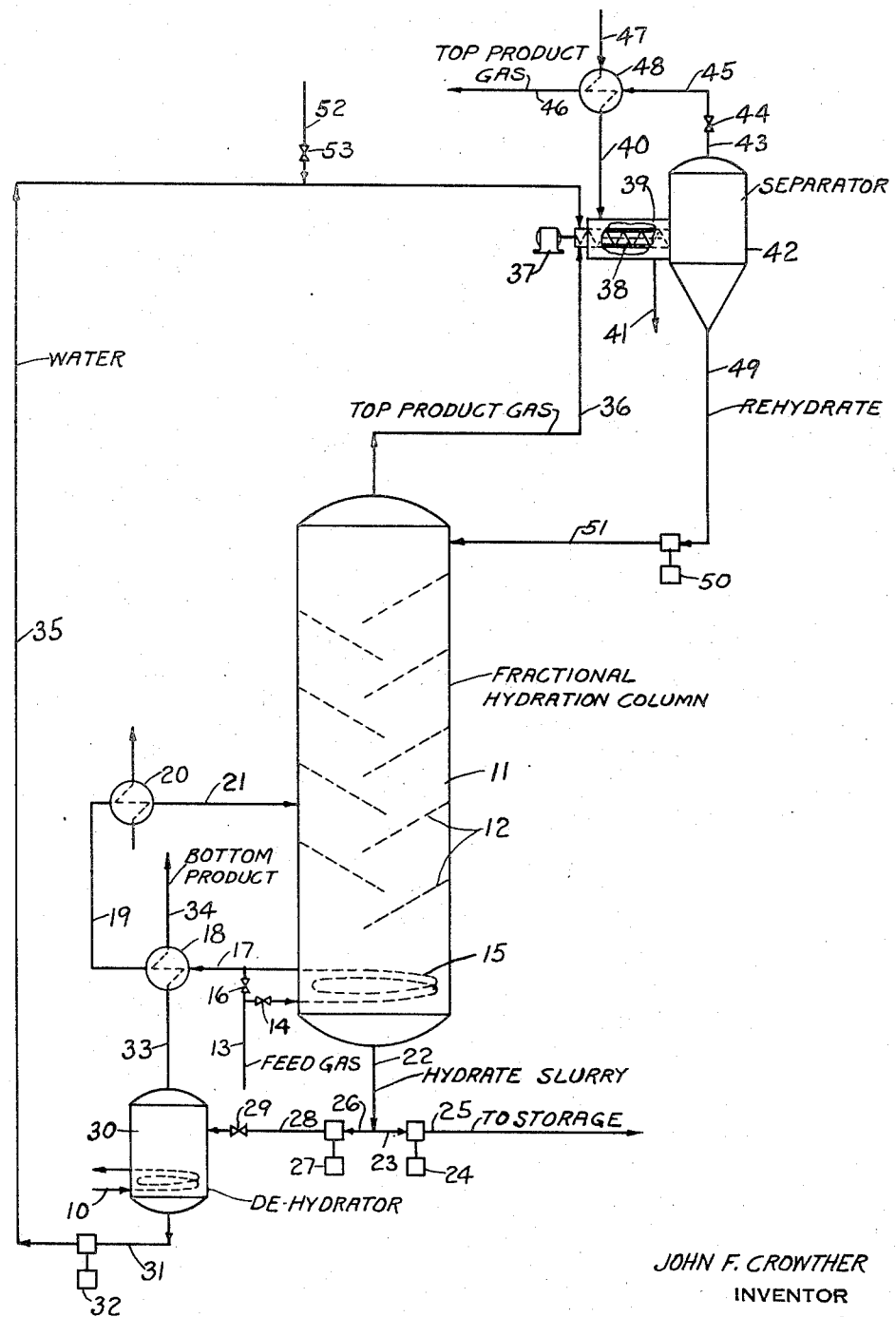
JOHN F. CROWTHER
INVENTOR
BY E. L. Liebrecht
ATTORNEY Patented May 7, 1946

2,399,723

UNITED STATES PATENT OFFICE 2,399,723

GAS HYDRATION

John F. Crowther, Mount Vernon, N. Y., assignor to The M. W. Kellogg Company, Jersey City, N. J., a corporation of Delaware Application June 28, 1941, Serial No. 400,272

17 Claims. (Cl. 260—676)

This invention relates to gas hydration, and one of its objects is to facilitate the recovery, separation and handling of hydrate-forming gases. Included among the more specific objects of the invention is the provision of a process for fractionating hydrate-forming gases (and particularly those which are difficult to liquefy) from gaseous mixtures, in which process the temperatures need not be so low nor the pressures to high as in conventional fractionation processes based upon differences in boiling point.

Another object of the invention is to afford a method of storing and shipping difficultly liquefiable hydrate-forming gases at reduced volume without employing low enough temperatures or high enough pressures to bring about liquefaction thereof. Other objects will appear in connection with the description of the invention hereinafter given.

Among the more common gases known to be capable of hydrate formation are methane, ethane, ethylene, propane, acetylene, methyl chloride, carbon dioxide, sulphur dioxide, nitrous oxide, chlorine, bromine, arsine, hydrogen sulphide, argon and krypton. Such gases, when in the presence of water and when under suitable conditions of temperature and pressure, will form loosely-associated solid hydrates of definite and constant composition.

In general, my invention contemplates subjecting a gas containing one or more hydratable constituents to conditions of temperature and pressure in the presence of water such that a hydrate or hydrates will form, separating the solid hydrated material from remaining gases, and either storing or shipping the separated material as hydrate or decomposing it to release its gaseous component. In this manner I may separate hydratable gases from mixtures thereof with non-hydratable gases. I have discovered, moreover, that when a gaseous mixture containing more than one hydratable constituent is subjected to partial hydration, a mixture of hydrates is formed wherein the relative proportion of the more readily hydratable constituents is greater, and that of the less readily hydratable constituents is less, than in the gaseous mixture from which the mixture of hydrates was formed. In fact, I have found that binary and multicomponent mixtures of hydratable gases behave under hydrate-forming and hydrate-decomposing conditions in a manner which is similar to their behaviour under condensing and vaporizing conditions, respectively. It is contemplated by my invention to take advantage of such behaviour in order to accomplish fractional hydration, in which a technique similar to that of fractional distillation may be employed. Numerous other separative procedures, having effects similar to partial condensation, stabilization, absorption, rectification, stripping, and other steps which depend upon differences in boiling point, may be accomplished within the scope of my invention.

It is possible for a hydrate-forming gas to enter into hydration with ice and water vapor as well as with liquid water, but owing to the ease with which liquid water may be contacted with gas, the facility of control and the simplicity of the required equipment, I prefer to employ liquid water as the reactant in practicing my invention. That is to say, I prefer either to effect hydration at temperatures above 32° F. or, as may be advantageous under certain circumstances, I effect hydration at lower temperatures after introducing a suitable anti-freeze such as alcohol or glycerine into water from which hydrates are to be formed, for the purpose of maintaining it in the liquid phase at the desired hydration temperature.

If an excess of pure water is always present, at any given temperature there is only one pressure under which a pure hydrate-forming gas can exist in equilibrium with its hydrate. At higher pressures the gas will be completely converted to hydrate, and at lower pressures decomposition of the hydrate will take place. This equilibrium pressure will vary directly with the temperature. If a non-hydratable gas is also present, then the equilibrium is fixed by the partial pressure of the hydratable gas, rather than the total pressure. It is found that for most hydrate-forming gases, the equilibrium hydration pressures are doubled by a temperature rise of about 9° to 14° F.

The more difficultly hydratable gases require inordinately high pressures for hydration as temperatures above 70° F. are reached. The effect of a non-hydratable gas in admixture with a gas to be hydrated being to increase the total pressure necessary for hydrate formation, it will be understood that the optimum hydration temperature in any given instance depends upon the gas to be hydrated and the extent to which non-hydratable gases are present, as well as upon the relative costs of gas compression and gas refrigeration.

The physical form and appearance of solid gas hydrates is very similar to that of frozen water, and they may, according to the manner of formation, resemble ice, snow, or frost. Depending upon the particular gas involved, from 2 to 10 mols of water combine with one mol of gas to form one mol of hydrate. For the majority of the common hydrate-forming gases, the exothermic heat of formation lies between about 14,000 and 20,000 calories per gram mol of hydrate, when liquid water and gas are the reactants.

When a mixture of hydrate-forming gases is hydrated under a given pressure, it is found that hydrate formation commences at a temperature intermediate the temperatures at which the least- and most-readily hydratable constituents of the mixture can be separately hydrated at the given pressure. As the temperature is lowered further, more and more hydrate forms until hydration is completed while the temperature is still above that required to hydrate separately the most-difficultly hydratable constituent. The hydrates first to form will be rich in the more readily hydratable constituents and the hydrates last formed will be relatively rich in the more difficultly hydratable constituents. When the temperature is raised, decomposition of the hydrates of the several constituents will take place in a manner opposite to that in which they were formed, i. e., a preponderance of the more difficultly hydratable constituents will be liberated first.

Although not limited thereto, the present invention is well exemplified by its application to the separation of methane and ethane from each other and from non-hydratable gases. These light hydrocarbons are produced in abundance in connection with the refining of petroleum, and owing to their low boiling points and low solubility in the usual hydrocarbon absorbents, are relatively difficult to separate by processes depending upon differences in boiling point and volatility. The invention will now be described in considerable detail and with reference to the accompanying drawing as applied to the fractional hydration of methane and ethane. It is to be understood, however, that this is by way of example only, and in no way limits the scope of the invention.

The drawing, which forms part of the instant specification and is to be read in conjunction therewith, is a diagrammatic process flow sheet in which items of equipment are shown conventionally.

Referring now to the drawing, the column 11 is a vertically elongated closed vessel adapted to withstand internal pressure and provided with a plurality of contacting baffles 12, similar to those sometimes employed in distilling columns and other countercurrent vapor-liquid contacting devices.

A mixture of methane and ethane to be fractionated, which will be assumed to be initially at atmospheric temperature or higher, is introduced under pressure into line 13. Selection of a suitable pressure at which to introduce the feed gas will be influenced by the composition of the latter, the desired degree of product purity, and economic considerations, as will be hereinafter more fully explained.

Fractional hydration of the feed gas is to take place in column 11 at sub-atmospheric temperatures which will be determined by the pressure, and it is desirable that the feed be pre-cooled at least to the temperature existing within the column 11 at the point at which the feed gas is introduced. Also it is necessary to supply heat to the base of column 11, and an economical method of accomplishing both the latter objects is to exchange heat between the feed gas and the contents of the bottom of the column. To this end I may divert all or a portion of the feed gas from line 13 through a heat-exchanging coil 15 located in the base of column 11. The amount so diverted may be controlled by valve 14 and will depend upon the initial temperature of the feed gas and the amount of heat desired to be transferred. Feed gas not so diverted is passed through valve 16 and is rejoined by the cooled diverted portion in line 17.

Further cooling of the feed gas may be economically achieved by heat exchange with a cold gas stream, derived from a subsequently-to-be-described step of the process, in exchanger 18. Thence the cooled feed gas travels via line 19 to a final cooler 20, to which any suitable refrigerant may be supplied, for final adjustment of the temperature to the desired point. From cooler 20 the feed gas is introduced into column 11 at an intermediate point thereof via line 21.

Upon entering the fractional hydration column 11 the feed gas comes in contact with a downwardly flowing cold slurry of hydrate crystals and water. The temperature and pressure of the gas will have been so adjusted that hydration of the more readily hydratable constituent (ethane), and also some of the more difficultly hydratable one (methane) will commence, and hydrates thus formed will travel down over the baffles in the column in a water slurry until they reach the bottom.

Warm feed gas traversing the heat-exchanging coil 15 raises the temperature of the hydrate slurry in the base of the column sufficiently to bring about the decomposition of a portion thereof. In accordance with the principles of hydrate decomposition which I have discovered, gas liberated by the decomposition of hydrates in the base of column 11 will be relatively rich in methane as compared to the hydrate mixture from which it was formed, the effect of coil 15 being similar to that of a reboiler in the base of a fractionating column. The gas liberated passes back up through the column along with the unhydrated portion of the feed.

Hydrate slurry is continuously withdrawn from the base of column 11 through line 22 and will be relatively rich in ethane as compared to the feed gas. The withdrawn hydrate slurry passes through line 26 to a slurry pump 27 which discharges it through line 28 to a pressure reduction valve 29, whereby a reduction in the pressure is effected. At the lower pressure the hydrates undergo decomposition and in decomposing absorb the amount of heat which was evolved during their formation. This brings about a lowering in temperature which if unchecked would re-establish equilibrium at the lower pressure. In order to bring about complete decomposition of the hydrates in the dehydrator 30, I provide a heating coil 10 through which steam or other heating medium may be circulated, or if desired a stream of warm feed gas may be cooled in coil 10 preparatory to treatment thereof, as in coil 15. I maintain the temperature in dehydrator 30 high enough to effect complete dehydration under the existing pressure. It is necessary, of course, that this temperature be above the freezing point of the aqueous decomposition product of the hydrate—32° F. if no anti-freeze is being used. Disengagement of gas from liquid water occurs in dehydrator 30 and the gas passes off through line 33 to heat exchanger 18, wherein it cools the feed gas about to enter the hydration column. The gas leaving dehydrator 30 through line 33 constitutes the bottom product of the fractional hydration operation and exits through line 34 to be disposed of as desired.

Cold water liberated by the decomposition of hydrates in dehydrator 30 is withdrawn through line 31 and forced by pump 32 through line 35 into the interior of a double-pipe cooler 39, the inner surface of which is continuously scraped by a helical scraper 38 driven by a motor 37.

Gas remaining unhydrated under the temperature and pressure conditions existing in column 11 passes upwardly therethrough and is transferred by line 36 to enter the scraped cooler 39 at the same point as the water stream from line 35. A suitable refrigerant is passed through line 40 into the outer shell of the double-pipe cooler 39 and after indirectly cooling the gas and water streams is withdrawn through line 41.

The gas introduced into the scraped cooler 39, having withstood hydration in column 11, will be relatively rich in methane as compared to the feed gas and will require lower temperatures for hydration. Cooler 39 is refrigerated to a temperature sufficiently low to cause additional hydrate formation therein and the scraper 38 forces the resultant hydrate crystals through the cooler into separator 42. Gas remaining unhydrated at the low temperature, comprising an even larger percentage of methane, is withdrawn from separator 42 through line 43 and is expanded through valve 44 to produce a lowering in temperature by the auto-refrigerative effect. The cold unhydrated gas continues through line 45 to a heat exchanger 48 wherein it cools the refrigerant coming from line 47 which is being supplied to the scraped cooler 39. Thereafter the unhydrated gas from separator 42, constituting the top product of the fractional hydration, is disposed of through line 46.

Hydrate crystals and excess water are withdrawn from separator 42 through line 49 and returned by pump 50 through line 51 to the top of the hydration column 11. The material thus returned may be spoken of as "rehydrate" and as will be seen is analogous to the reflux which is used in fractional distillation columns.

Passing down from the top of column 11 the rehydrate comes in contact with rising gas containing a greater proportion of ethane and having a somewhat higher temperature. Under these circumstances the rehydrate will partially decompose into water and gas and simultaneously will absorb sufficient heat to bring about the formation of hydrates having a higher ethane content than that decomposed, the ethane being extracted from the rising gas. In this manner rectification of the gas introduced into the column 11 will proceed. When proper conditions have been established, the top product gas withdrawn through line 46 will contain more methane and less ethane, and the bottom product gas withdrawn through line 34 will contain more ethane and less methane, than the feed.

Because of the introduction of relatively cold rehydrate at the top of the column and the heating accomplished by coil 15, a temperature gradient will be set up between the top and bottom of the column. As in fractional distillation, the greater the amount of rehydrate supplied to the top, the greater the amount of heat required at the bottom, and as these are conjointly increased, the precision of the fractionation will be increased. Also, the precision of fractionation is increased in proportion to the height of the column 11 and the number of baffles arranged therein. In the event that it were desired to produce a bottom product of high purity (high ethane content) and to neglect the purity of the top product, that portion of the column lying above the feed inlet and the rehydrate system could be dispensed with providing the feed were introduced in a hydrated condition. In such a case the process would resemble a stripping distillation. If, on the other hand, the desired purities were reversed, then the coil 15 would be unnecessary and the process would resemble dephlegmation. Dephlegmation and stripping are, of course, only examples of incomplete fractionation.

In the event that it is desired to store large quantities of the separated components of the feed, this may advantageously be done while the said components are combined with water as hydrates. Their volume is thereby greatly reduced so that less expensive containers will be required. One method of effecting such a procedure is to divert the hydrate slurry withdrawn from the tower 11 through line 22 into line 23 and pass it by means of pump 24 through line 25 to a suitable pressure-retentive insulated storage vessel. Since the water of hydration is thereby lost from the system, an equivalent amount of chilled water must be substituted for rehydrate-forming purposes and may suitably be introduced through line 52, which at other times, except when starting up the operation, may be closed off by means of valve 53. Also, the cooler 39 may be refrigerated sufficiently to hydrate all the gas coming from the top of column 11, and the net quantity of hydrate produced above the rehydrate requirement then diverted to storage.

Operation may be commenced by introducing water through line 52 and valve 53 until a sufficient amount for continuation of the process becomes available from separator 30.

If it were desired to produce substantially pure methane and ethane as the products of the described operation, then an amount of rehydrate sufficient to maintain the top temperature of column 11 at the equilibrium hydration temperature of pure methane would have to be supplied. Similarly, the bottom temperature would have to be maintained by means of coil 15 at the equilibrium hydration temperature of ethane. Such extensive fractionation would also necessitate a relatively high column with a large number of contacting baffles. The temperatures at the top and bottom of the column must in all cases approximate the respective equilibrium hydration temperatures of the products desired to be withdrawn therefrom. The proper temperatures may readily be found in any particular instance by trial.

In an example of the operation described, a feed gas containing 40% ethane and 60% methane was desired to be fractionated into two portions containing approximately 90% ethane and 90% methane respectively. The equilibrium temperature for the commencement of hydrate formation was found to be approximately 41° F. at a pressure of approximately 200 lbs. per spare inch, the chosen operating pressure. The feed gas was accordingly introduced at that temperature. The bottom temperature was approximately 46° F. and the top temperature was 34° F. The temperature in the dehydrator 30 was 33° F. and the pressure was in the vicinity of 120 pounds.

In practicing the invention, particularly when the feed gas contains a relatively large proportion of the more difficultly hydratable constituent, it is advantageous to hydrate all or a part of the feed gas, for example in a scraped cooler similar to 39, before introducing it into the column. This practice will reduce the amount of rehydrate required at the top of the column.

In the example previously given, an operating pressure of 400 lbs. per square inch would have permitted temperatures throughout the column about 10° higher than at 200 pounds, and this would have decreased the amount of refrigeration required—at the cost, however, of additional compression of the feed gas. If, on the other hand, the pressure had been only 100 pounds, the temperatures would have had to be about 10° F. lower, which would have brought the top temperature down to a point below the freezing point of water. Introduction of an anti-freeze would then have been necessary.

In the event that a diluent gas such as nitrogen, incapable of hydrate formation, had been present, either a higher pressure or lower temperatures, or both, would have been required. The presence of non-hydratable gases will in all cases increase the difficulty of the fractionation and will frequently necessitate anti-freeze precautions so that temperatures may be low enough to preclude uneconomically high pressures.

In one modification of the preceding process I fractionate partially in a first apparatus like that shown in the drawing, withdraw incompletely fractionated top and bottom products and subject one or both to further fractional hydration in auxiliary equipment exactly like that used in the preliminary stage. In such a case the further fractionation of the preliminary top product may feasibly be at a higher pressure, and that of the bottom product at a lower pressure, than the preliminary fractionation.

It will be understood that the statements thus far made with respect to the treatment of methane and ethane are qualitatively applicable to other hydrate-forming gases having different equilibrium pressure-temperature characteristics.

My invention may be of utility in a situation somewhat different from that assumed by the preceding descriptive matter, involving the problem of separating hydrate-forming material from non-hydrate-forming material. The treatment of a gaseous mixture containing 50% hydrogen and 50% ethane will be described by way of example, it being assumed that the desired products are hydrogen-free ethane and a gaseous mixture containing 75% hydrogen. The presence of 50% hydrogen in the original mixture will double the normal equilibrium hydration pressure of the ethane, at any given temperature, and the product containing 75% hydrogen will require quadruple pressure to maintain it in equilibrium with ethane hydrate.

In this embodiment of the invention I prefer to employ one or more scraped coolers such as 39, each arranged to discharge into a separator such as 42, and provided with connections for the introduction of water and gas. Each separator should embody withdrawing means for hydrate slurry and unhydrated gas, the former serving to transfer hydrate to a zone of lower pressure and/or higher temperature in which hydrate decomposition may be effected. The manner in which such apparatus may be used to produce hydrate will be apparent from the description already given. To accomplish the exemplary result previously mentioned, I preferably employ a pressure of about 400 lbs. per square inch and a temperature of about 37° F. Under such conditions a gas containing 25% ethane and 75% hydrogen will be in equilibrium with ethane hydrate, as the equilibrium hydration pressure of ethane at 37° F. is 100 pounds.

In order to reduce the amount of refrigeration and/or compression required in this process, I may conduct the hydration in stages, transferring unhydrated gas from a relatively low-pressure or high-temperature stage to a succeeding stage at higher pressure or lower temperature. Thus I may remove successive portions of ethane at 250 pounds and 300 pounds before completing the desired separation at 400 pounds, all three stages being at 37° F. Each stage may be carried out by means of an individual scraped refrigerated cooler and separator.

It is to be understood with respect to all embodiments of the invention herein disclosed that numerous other types of equipment may be readily devised for effecting simple hydration; for example, the well-known "Flakeice" machine, consisting of an internally refrigerated cylinder revolving in a vessel while partly submerged in water, may be used. The "Flakeice" machine may be readily adapted to hydration by making the vessel pressure-tight and providing means for introducing the gas to be hydrated. The continuously wetted, refrigerated surface affords an ideal environment for hydrate formation. Such machines are provided with "doctor" blades for scraping off ice as formed on the cylinder and customarily include means such as a screw conveyor suitable for withdrawing the ice, both of which will work with hydrate.

If an example of the previous type is taken with the exception that 50% methane is mixed with the hydrogen instead of ethane, a temperature of 37° F. would require a pressure of about 2000 pounds. If this is found to be uneconomically high I may use a temperature of about 3° F. and a pressure of about 1000 lbs. per square inch, an anti-freeze being employed to keep the water of hydration liquid at the low temperature. It should be noted that at temperatures below 32° F. in the presence of anti-freeze, the previously stated relationship between a 10° change in equilibrium hydration temperature and a two-fold change in the hydration pressure no longer applies. The corresponding figure is about 34° F. instead of 10° F. It is found that the introduction of an anti-freeze into water lowers the vapor pressure of the water, which latter is one of the factors determining equilibrium hydration conditions. When no anti-freeze is present, as in the examples earlier given, the vapor pressure of water is fixed by the temperature and hence need not be considered as a separate variable.

Referring again to the example involving methane and hydrogen, I may reduce the pressure required to hydrate methane to a 25% content in the residual gas by yet another expedient. It will be recalled that a methane-ethane mixture is completely hydrated at a higher temperature or a lower pressure than pure methane. I may take advantage of this fact in separating methane from a 50–50 mixture thereof with hydrogen by initially admixing ethane with the mixture in an amount equal to the methane content thereof. By so doing I may produce a 75% pure hydrogen at a hydration pressure approximately 55% lower than would otherwise be necessary, at any given temperature. Thus at 37° F. the pressure required would be only about 1100 pounds instead of 2000 pounds. By using more ethane a greater pressure reduction is possible, and an even greater advantage is obtained by using a more readily hydrated gas, such as propane, instead of ethane.

It is advantageous to refer at this point to the somewhat peculiar behaviour of certain hydrate-forming gases, of which butane is exemplary. It has not heretofore been possible to hydrate butane in the pure state. It is found, however, that as one proceeds from methane, which requires relatively high pressures for hydration, through ethane and propane, hydration becomes progressively easier, so that lacking knowledge to the contrary, it would be logical to assume that butane would be the easiest of all to hydrate. That is, hydration of butane might be expected to occur at relatively low pressure and at a relatively high temperature, compared to propane. Under the anticipated hydration conditions another property of butane intervenes, however, in that condensation of the butane will occur.

I have found that when butane is mixed with a more difficultly condensible and more difficultly hydratable gas, not only is there a lessened tendency for the butane to condense, as would be expected, but also the butane will readily form a hydrate in admixture with the hydrate of the other constituent of the mixture. Moreover, the effect of the butane is to enable hydration to proceed more readily, just as would be expected if the butane were in fact very easy to hydrate in the pure state. Hence, in the example last discussed, it would be especially advantageous to admix butane with the hydrogen-methane mixture in order to facilitate the removal of methane from the mixture by hydration. Less butane than either propane or ethane will need to be added to produce a given lowering in the required pressure. On the other hand, it is not feasible to add as much butane as is feasible with ethane, because of the likelihood of condensation occurring.

An interesting departure of the hydrate-forming hydrocarbons from the observed proportionality between molecular weight on the one hand and ease of hydration is found in the case of iso- and normal butane. When the behaviour of these isomers is studied under hydration conditions, methane or ethane being present for example to prevent condensation of the butanes, it is found that the normal and iso compounds differ more markedly from each other in their effect upon the ease of hydration of mixtures than they do from the adjacent homologue, propane. In accordance with one embodiment of my invention, I take advantage of this peculiarity to effect a separation of normal from iso-butane. Employing a fractional hydration technique as already described, I may add methane to a mixture of butane isomers and then bring about fractional hydration, producing as products mixtures of methane with normal butane and methane with iso-butane. The isomers are notoriously difficult to separate by fractional distillation, whereas when they have been fractionally hydrated in the presence of methane and the respective hydrates decomposed, a relatively simple separation by distillation or absorption will yield the separate isomers free of methane.

In order to facilitate storage and/or shipment, I may effect hydration of a perfectly pure hydrate-forming gas which is not in need of purification. I have found, for instance, that 500,000 cubic feet of ethane (standard conditions) can be stored as hydrate in a cylindrical vessel 12 feet in diameter and 40 feet long. The volume of a gas hydrate is, relatively speaking, not much greater than that of the water from which it is formed. About 29 cubic feet of ethane (standard conditions) may be hydrated with one gallon of water, and any other gas will require an amount in proportion to the number of mols of water required by one mol of its hydrate.

In view of the great variety of results obtainable by various embodiments of the invention, as illustrated by the foregoing examples, it should be understood that many other processing schemes can readily be devised within the scope of my inventive concept. Also, much latitude is possible in selecting suitable equipment for practicing various forms of the invention. Numerous existing devices for handling solids and slurries are adaptable to the handling and transfer of hydrates. While I have shown gravity flow of a hydrate slurry countercurrently contacting a feed gas in a baffled column, the art of vapor-liquid and vapor solid contacting holds innumerable other methods which may be used, and advantage may well attach in some cases to those contacting devices wherein positive mixing of separate phases is brought about, together with mechanical movement of solids through a contacting zone, by means of paddles, rabble arms, or the like. It has been observed that agitation to at least some extent is positively necessary for rapid and immediate hydrate formation.

In order to insure the regular transfer of heat to decomposing hydrates in the base of a column such as 11 or in a dehydrator such as 30, I may employ mixers of any suitable type, such as propellors, for continuously mixing the slurry and preventing agglomeration of hydrate crystals. This same object may desirably be accomplished in separators such as 42.

A great many different methods of recovering and recuperating the refrigeration employed in hydration may obviously be devised, and those shown and described herein are exemplary only. It is not necessary to employ scraped cooling surfaces in all cases, as the heat of hydration may be removed by continuously circulating water from a hydrating zone to a cooling zone and back again, while preventing access of gas and previously formed hydrates to the cooling surfaces. In fact, ordinary ice may be introduced into a hydrating zone which is to be maintained at a temperature above 32° F., and by melting will absorb heat of hydration.

My invention is not limited to the treatment of the hydrocarbon gases mentioned herein by way of example, but only in and by the following claims.

I claim:

1. In the treatment of a gas mixture comprising two hydrate-forming gases the process which comprises contacting said mixture with water under super-atmospheric pressure at a temperature sufficiently low to form solid hydrates of said gases, heating said solid hydrates to a higher temperature to decompose a portion thereof and release gas and water, separating released gas from the remaining mixture of water and hydrates, and contacting said last-mentioned mixture with a gas mixture comprising said two hydrate-forming gases under super-atmospheric pressure and at a temperature sufficiently low to form additional quantities of said hydrates.

2. In the treatment of gas mixture comprising a first hydrate-forming gas and a second hydrate-forming gas more readily hydratable than said first gas the process comprising contacting with water a gas mixture comprising said first and second gases under super-atmospheric pressure and at a temperature sufficiently low to form a mixture of solid hydrates of said first and second gases, heating the mixture of hydrates to a higher temperature to decompose a portion thereof to gas and water, separating gas thus released from the accompanying mixture of water and remaining hydrate, and contacting said last-mentioned mixture with a gas mixture containing said first and second gases in a ratio of said second gas to said first gas higher than the corresponding ratio in the gas mixture from which said remaining hydrate was formed, said last-mentioned contact being effected under super-atmospheric pressure and at a temperature sufficiently low to form additional quantities of said hydrates.

3. In the treatment of gas mixtures comprising a first hydrate-forming gas and a second hydrate-forming gas more readily hydratable than said first gas the process comprising contacting with water a gas mixture comprising said first and second gases under super-atmospheric pressure and at a temperature sufficiently low to form a mixture of solid hydrates of said first and second gases, contacting the hydrates thus formed at a higher temperature with a gas mixture containing said first and second gases in a ratio of said second gas to said first gas higher than the corresponding ratio in the gas mixture from which said hydrates were formed to decompose a portion of said hydrates to gas and water, said last-mentioned contact being effected under super-atmospheric pressure and at a temperature sufficiently low to form additional quantities of hydrates with said water.

4. In the treatment of gas mixtures comprising a first hydrate-forming gas and a second hydrate-forming gas more readily hydratable than said first gas the process comprising contacting with water a gas mixture comprising said first and second gases under super-atmospheric pressure and at a temperature sufficiently low to form a mixture of solid hydrates of said first and second gases, heating the mixture of hydrates to a higher temperature to decompose a portion thereof to gas and water, separating gas thus released from the accompanying mixture of water and remaining hydrate, and contacting said last-mentioned mixture at a temperature higher than the temperature of formation of said remaining hydrate with a gas mixture containing said first and second gases in a ratio of said second gas to said first gas higher than the corresponding ratio in the gas mixture from which said remaining hydrate was formed, said last-mentioned contact being effected under super-atmospheric pressure and at a temperature sufficiently low to form additional quantities of said hydrates.

5. In the treatment of a gas mixture comprising two hydrate-forming gases the process which comprises contacting said mixture with water under super-atmospheric pressure at a temperature sufficiently low to form solid hydrates of said gases with a portion of said water, heating the resulting mixture of water and solid hydrates to a higher temperature to decompose a portion thereof and release gas and additional water, separating released gas from the remaining mixture of water and hydrates, and contacting said last-mentioned mixture with a gas mixture comprising said two hydrate-forming gases under super-atmospheric pressure and at a temperature sufficiently low to form additional quantities of said hydrates.

6. In the treatment of a gas mixture comprising two hydrate-forming gases the process which comprises continuously introducing said gas mixture into a vertically elongated hydration zone whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmospheric pressure, maintaining the temperature of said slurry at at least one point in said zone above said point of entry sufficiently low to effect substantial hydration of said gas mixture, and maintaining the temperature of said slurry at at least one point in said zone below said point of entry sufficiently high to decompose partially the hydrates formed in said zone at lower temperatures.

7. In the treatment of a gas mixture comprising two hydrate-forming gases the process which comprises continuously introducing said gas mixture into a vertically elongated hydration zone at an intermediate point whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmospheric pressure, maintaining the temperature of said slurry at at least one point in said zone above said point of entry sufficiently low to effect substantial hydration of said gas mixture, and maintaining the temperature of said slurry at at least one point in said zone below said point of entry sufficiently high to decompose partially the hydrates formed in said zone at lower temperatures.

8. In the treatment of a gas mixture comprising two hydrate-forming gases the process which comprises continuously introducing said gas mixture into a vertically elongated hydration zone at an intermediate point whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmospheric pressure, maintaining the temperature of said gas mixture at the point of entry at approximately the equilibrium temperature of said mixture for the formation of hydrates of said gases at said super-atmospheric pressure, maintaining the temperature of said slurry at at least one point in said zone above said point of entry slightly lower than said equilibrium temperature, and heating said slurry below said point of entry to a temperature slightly higher than said equilibrium temperature.

9. In the treatment of a gas mixture comprising two hydrate-forming gases the process which comprises continuously introducing said gas mixture into a vertically elongated hydration zone at an intermediate point whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmosphere pressure, and maintaining a temperature gradient in said zone from a top temperature slightly lower than the equilibrium temperature of said gas mixture for the formation of hydrates at said pressure to a bottom temperature slightly higher than said equilibrium temperature.

10. In the treatment of a gas mixture comprising two hydrate-forming gases the process which comprises continuously introducing said gas mixture into a vertically elongated hydration zone whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmospheric pressure, maintaining the temperature of said slurry at at least one point in said zone above said point of entry sufficiently low to effect substantial hydration of said gas mixture, maintaining the temperature of said slurry at at least one point in said zone below said point of entry sufficiently high to decompose partially the hydrates formed in said zone at lower temperatures, withdrawing the unhydrated remainder of said gas mixture from the upper portion of said zone, contacting said withdrawn gases with water under conditions of temperature and pressure effective to form hydrates of said gases, and introducing hydrates thus formed into said hydration zone in the upper portion thereof.

11. The method of enriching a mixture of gas hydrates with the hydrate of the more readily hydratable constituent thereof which comprises bringing said mixture of hydrates to conditions of temperature and pressure which permit partial decomposition of said hydrate mixture with the formation of gas and water, and contacting said hydrate mixture at said decomposition temperature and pressure with a gas mixture containing said more readily hydratable constituent in a concentration greater than the equilibrium concentration thereof at said temperature and pressure, whereby there is effected simultaneous decomposition of a portion of said first-mentioned hydrates and formation of additional hydrates of said more readily hydratable constituent.

12. A process for fractionating a gas mixture essentially consisting of isobutane and normal butane which comprises adding to said mixture of isobutane and normal butane a substantial proportion of methane to form a resulting mixture essentially consisting of the butanes and methane, continuously introducing the mixtures of butanes and methane thus obtained into a vertically elongated hydration zone whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under super-atmospheric pressure, maintaining the temperature of said slurry at at least one point in said zone above said point of entry sufficiently low to effect substantial hydration of said gas mixture, and maintaining the temperature of said slurry at at least one point in said zone below said point of entry sufficiently high to decompose partially the hydrates formed in said zone at lower temperatures, continuously withdrawing hydrates remaining after said partial decomposition from the lower portion of said hydration zone, and continuously withdrawing the remaining unhydrated portion of said gas mixture from the upper portion of said hydration zone.

13. In the treatment of a gas mixture comprising two hydrate-forming gases the process which comprises contacting said mixture with water under superatmospheric pressure at a temperature sufficiently low to form solid hydrates of said gases, heating said solid hydrates to a higher temperature to decompose a portion thereof and release gas and water, separating released gas from the remaining mixture of water and hydrates, contacting said mixture of water and hydrates with a gas mixture comprising said two hydrate-forming gases under superatmospheric pressure and at a temperature sufficiently low to form additional quantities of said hydrates, separating the resulting mixture of hydrates from unhydrated gas, reducing the pressure on said separated mixture of hydrates to effect decomposition thereof to gas and water, and bringing gas thus released into indirect heat exchange with the last-mentioned gas mixture comprising said two hydrate-forming gases prior to contact of said gas mixture with said mixture of water and hydrates.

14. In the treatment of a gas mixture comprising two hydrate-forming gases the process which comprises contacting said mixture with water under superatmospheric pressure at a temperature sufficiently low to form solid hydrates of said gases, heating said solid hydrates to a higher temperature to decompose a portion thereof and release gas and water, separating released gas from the remaining mixture of water and hydrates, contacting said last-mentioned mixture with a gas mixture comprising said two hydrate-forming gases under superatmospheric pressure and at a temperature sufficiently low to form additional quantities of said hydrates, separating said last-mentioned hydrates from unhydrated gases, reducing the pressure on said separated hydrates to effect decomposition thereof to gas and water, and contacting water thus separated with said first-mentioned gas mixture as described.

15. In the treatment of a gas mixture comprising two hydrate-forming gases the process which comprises continuously introducing said gas mixture into a vertically elongated hydration zone, whereby said gas mixture flows upwardly in said zone from the point of entry of said gas mixture into said zone to the upper portion thereof, flowing downwardly in said zone in intimate contact with said upwardly rising gases a slurry of hydrates of said gases in water, maintaining said zone under superatmospheric pressure, maintaining the temperature of said slurry at at least one point in said zone above said point of entry sufficiently low to effect substantial hydration of said gas mixture, and subjecting hydrates in said zone at at least one point below said point of entry to indirect heat exchange with said gas mixture prior to introduction thereof into said zone to heat said hydrates to a temperature sufficiently high to decompose partially hydrates formed in said zone at lower temperatures.

16. The process of fractionating a mixture of normally gaseous hydrate-forming compounds, that includes passing a stream of the solid hydrates of said compounds downwardly within a vertically extended fractionating zone and therein dissociating a portion of the hydrates to release the hydrated material thereof as vapor and leave residual hydrates of selected composition, passing the released vapor upwardly within said fractionating zone, introducing water to the upper interior of the fractionating zone, and maintaining said upper interior of the zone under temperature and pressure conditions at which a portion of said vapor is reconverted to solid hydrates.

17. The process of fractionating a mixture of normally gaseous hydrate-forming compounds, that includes passing a stream of the solid hydrates of said compounds downwardly within a fractionating zone containing a vertical series of vapor-liquid contact means, subjecting the hydrates to dissociation to release the hydrated components thereof as vapor, passing the vapor upwardly in contact with water carried on said vapor-liquid contact means, and maintaining the material on the last mentioned vapor-liquid contact means at a temperature causing re-conversion to hydrates of a portion of the vapors.

JOHN F. CROWTHER.